(12) United States Patent
Bjerrum et al.

(10) Patent No.: US 11,956,626 B2
(45) Date of Patent: Apr. 9, 2024

(54) CRYPTOGRAPHIC KEY GENERATION FOR MOBILE COMMUNICATIONS DEVICE

(71) Applicant: Nokia Technologies Oy, Espoo (FI)

(72) Inventors: Bo Holm Bjerrum, Nibe (DK); Anja Jerichow, Grafing bei München (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 316 days.

(21) Appl. No.: 17/603,833

(22) PCT Filed: Apr. 17, 2019

(86) PCT No.: PCT/FI2019/050314
§ 371 (c)(1),
(2) Date: Oct. 14, 2021

(87) PCT Pub. No.: WO2020/212643
PCT Pub. Date: Oct. 22, 2020

(65) Prior Publication Data
US 2022/0182821 A1     Jun. 9, 2022

(51) Int. Cl.
*H04W 12/041* (2021.01)
*H04L 9/08* (2006.01)
*H04W 12/0431* (2021.01)
*H04W 12/06* (2021.01)

(52) U.S. Cl.
CPC ......... *H04W 12/041* (2021.01); *H04L 9/0866* (2013.01); *H04W 12/0431* (2021.01); *H04W 12/068* (2021.01); *H04L 2209/80* (2013.01)

(58) Field of Classification Search
CPC ............. H04W 12/068; H04W 12/041; H04W 12/0431; H04L 9/0866; H04L 63/0846; H04L 63/0838
See application file for complete search history.

(56) References Cited

U.S. PATENT DOCUMENTS

| 7,181,620 B1 * | 2/2007 | Hur ..................... H04L 63/0869 713/168 |
| 8,611,536 B2 * | 12/2013 | Semple ................. H04W 12/06 380/270 |
| 9,385,862 B2 * | 7/2016 | Escott ................... H04L 9/0816 |
| 11,082,844 B2 * | 8/2021 | Ben Henda ......... H04W 12/009 |
| 11,108,749 B2 * | 8/2021 | Mondello ......... H04W 12/0431 |

(Continued)

OTHER PUBLICATIONS

Basin, David, et al. "A formal analysis of 5G authentication." Proceedings of the 2018 ACM SIGSAC conference on computer and communications security. 2018, pp. 1383-1396. (Year: 2018).*

(Continued)

*Primary Examiner* — Kari L Schmidt
(74) *Attorney, Agent, or Firm* — Robert P. Michal, Esq.; Carter, DeLuca & Farrell LLP

(57) ABSTRACT

According to an example aspect of the present invention, there is provided method, comprising: generating a first key based on a first input specific to a mobile device, wherein the first input comprises measurement of mutable code of the mobile device and a unique device secret, generating a symmetric second key on the basis of the first key and a second input specific to the mobile device, and generating authentication credentials on the basis of the second key for authenticating the mobile device to a mobile communications network.

16 Claims, 3 Drawing Sheets

(56) References Cited

U.S. PATENT DOCUMENTS

| | | | | |
|---|---|---|---|---|
| 2006/0120531 | A1* | 6/2006 | Semple | H04W 12/06 380/270 |
| 2007/0005972 | A1* | 1/2007 | Mizikovsky | H04L 9/3271 713/171 |
| 2011/0010770 | A1* | 1/2011 | Smith | H04L 9/083 726/18 |
| 2011/0179474 | A1* | 7/2011 | Yegin | H04L 63/123 726/6 |
| 2014/0004824 | A1* | 1/2014 | Campagna | H04L 9/0866 455/411 |
| 2015/0244685 | A1 | 8/2015 | Shah et al. | |
| 2017/0223531 | A1* | 8/2017 | Mestanov | H04W 12/041 |
| 2018/0184297 | A1 | 6/2018 | Mohamed et al. | |
| 2018/0257605 | A1* | 9/2018 | Oberbeckmann | B60R 25/245 |
| 2018/0375852 | A1 | 12/2018 | Thom et al. | |
| 2019/0268335 | A1* | 8/2019 | Targali | H04W 12/72 |
| 2020/0313866 | A1* | 10/2020 | Mondello | H04W 12/35 |
| 2022/0038272 | A1* | 2/2022 | Hershman | H04L 9/0866 |
| 2022/0103538 | A1* | 3/2022 | Nix | H04L 63/08 |
| 2022/0182821 | A1* | 6/2022 | Bjerrum | H04W 12/041 |
| 2022/0303769 | A1* | 9/2022 | Liu | H04L 9/3268 |
| 2023/0208823 | A1* | 6/2023 | Nakarmi | H04L 63/08 455/411 |
| 2023/0239284 | A1* | 7/2023 | Simic | H04L 63/0815 726/8 |
| 2023/0367575 | A1* | 11/2023 | Izzo | G06F 8/65 |

OTHER PUBLICATIONS

D. Schinianakis, "Alternative Security Options in the 5G and IoT Era," in IEEE Circuits and Systems Magazine, vol. 17, No. 4, pp. 6-28, Fourthquarter 2017. (Year: 2017).*

Extended European Search Report received for corresponding European Patent Application No. 19925304.8, dated Oct. 11, 2022, 6 pages.

Jager et al., "Rolling DICE—Lightweight Remote Attestation for COTS IoT Hardware", ARES '17: Proceedings of the 12th International Conference on Availability, Reliability and Security, Aug. 29-Sep. 1, 2017, pp. 1-8.

"Platform Integrity for IoT Standardization Activities in Trusted Computing Group (TCG)", ITU-T Focus Group Data Processing and Management to support IoT and Smart Cities & Communities (FG-DPM), Jul. 2017, 33 pages.

"3rd Generation Partnership Project; Technical Specification Group Services and System Aspects; Service requirements for the 5G system; Stage 1 (Release 16)", 3GPP TS 22.261, V16.6.0, Dec. 2018, 73 pages.

"3rd Generation Partnership Project; Technical Specification Group Services and System Aspects; Study on enhancement of 5G System (5GS) for vertical and Local Area Network (LAN) services (Release 16)", 3GPP TR 23.734, V16.1.0, Mar. 2019, pp. 1-111.

"3rd Generation Partnership Project; Technical Specification Group Services and System Aspects; System Architecture for the 5G System; Stage 2 (Release 15)", 3GPP TS 23.501, V15.5.0, Mar. 2019, pp. 1-241.

"3rd Generation Partnership Project; Technical Specification Group Services and System Aspects; Study on security for 5GS enhanced support of Vertical and LAN Services; (Release 16)", 3GPP TR 33.819, V0.2.0, Feb. 2019, pp. 1-18.

"Dice", Trusted Computing Group, Retrieved on Oct. 20, 2021, Webpage available at : https://trustedcomputinggroup.org/workgroups/dice-architectures/.

"3rd Generation Partnership Project; Technical Specification Group Services and System Aspects; 3GPP System Architecture Evolution (SAE); Security architecture (Release 15)", 3GPP TS 33.401, V15. 6.0, Dec. 2018, pp. 1-163.

"3rd Generation Partnership Project; Technical Specification Group Services and System Aspects; 3G Security; Security architecture (Release 15)", 3GPP TS 33.102, V15.1.0, Dec. 2018, pp. 1-77.

"3rd Generation Partnership Project; Technical Specification Group Services and System Aspects; Generic Authentication Architecture (GAA); Generic Bootstrapping Architecture (GBA) (Release 15)", 3GPP TS 33.220, V15.4.0, Dec. 2018, pp. 1-93.

"Hardware Requirements for a Device Identifier Composition Engine", TCG, Family "2.0", Mar. 22, 2018, 12 pages.

"3rd Generation Partnership Project; Technical Specification Group Services and System Aspects; Security architecture and procedures for 5G system (Release 15)", 3GPP TS 33.501, V15.4.0, Mar. 2019, pp. 1-187.

Aboba et al., "Extensible Authentication Protocol (EAP)", RFC 3748, Network Working Group, Jun. 2004, pp. 1-67.

International Search Report and Written Opinion received for corresponding Patent Cooperation Treaty Application No. PCT/FI2019/050314, dated Dec. 16, 2019, 18 pages.

"Implicit Identity Based Device Attestation", TCG, Version 1.0, Mar. 5, 2018, 18 pages.

* cited by examiner

CRYPTOGRAPHIC KEY GENERATION FOR MOBILE COMMUNICATIONS DEVICE

RELATED APPLICATION

This application was originally filed as PCT Application No. PCT/FI2019/050314, filed on Apr. 17, 2019, of which is incorporated herein by reference in its entirety.

FIELD

Various example embodiments relate to cryptographic key generation for mobile communication device.

BACKGROUND

With the fast increase of new devices being wirelessly connected and substantial data traffic growth, requirements for wireless networks and connections are also changing. Upcoming generations of mobile communication systems, such as Fifth Generation (5G) communication systems, are expected to enable applications, such as virtual reality, augmented reality, reliable remote operation of machines, factory automation, network-assisted control of traffic and self-driving vehicles. Further requirements for future communication systems are caused by the increasing internet-working of physical devices such as appliances, vehicles, buildings, and other items that are embedded with electronics, software, sensors, actuators, and network connectivity that enable the devices to collect and exchange data.

Co-existence and co-operation between cellular access, such as Third Generation Partnership Project (3GPP) Long Term Evolution (LTE) or New Radio Access Technology (N-RAT) based access, and non-cellular access, such as IEEE802.11 based wireless local area network (WLAN) access, has been under development. Access authentication for non-cellular access may be provided by cellular system network functions, such as a 3GPP network function configured to operate as authentication server for non-3GPP access. A non-public network (NPN), which may also be referred to as private network, may comprise a non-cellular access network and NPN core network (CN) functions. At least some of the devices connecting to an NPN may be constrained devices and do not have the same cryptographic tamper-resistant hardware/resources as non-constrained user equipment devices connecting a public mobile network.

SUMMARY

Some aspects of the invention are defined by the features of the independent claims. Some specific embodiments are defined in the dependent claims.

According to a first aspect, there is provided a method, comprising: generating a first key based on a first input specific to a mobile device, wherein the first input comprises measurement of mutable code of the mobile device and a unique device secret, generating a symmetric second key on the basis of the first key and a second input specific to the mobile device, and generating authentication credentials on the basis of the second key for authenticating the mobile device to a mobile communications network.

According to a second aspect, there is provided an apparatus, comprising means for performing: generating a first key based on a first input specific to a mobile device, wherein the first input comprises measurement of mutable code of the mobile device and a unique device secret, generating a symmetric second key on the basis of the first key and a second input specific to the mobile device, and generating authentication credentials on the basis of the second key for authenticating the mobile device to a mobile communications network.

There is also provided an apparatus comprising at least one processor, at least one memory including computer program code, the at least one memory and the computer program code being configured to, with the at least one processor, cause the apparatus at least to carry out features in accordance with the first or any embodiment thereof.

According to still further aspects, there are provided a computer program and a computer-readable medium, or a non-transitory computer-readable medium, configured, when executed in a data processing apparatus, to carry out features in accordance with the first aspect, or an embodiment thereof.

BRIEF DESCRIPTION OF THE DRAWINGS

Some example embodiments will now be described with reference to the accompanying drawings.

EMBODIMENTS

Figure 1:
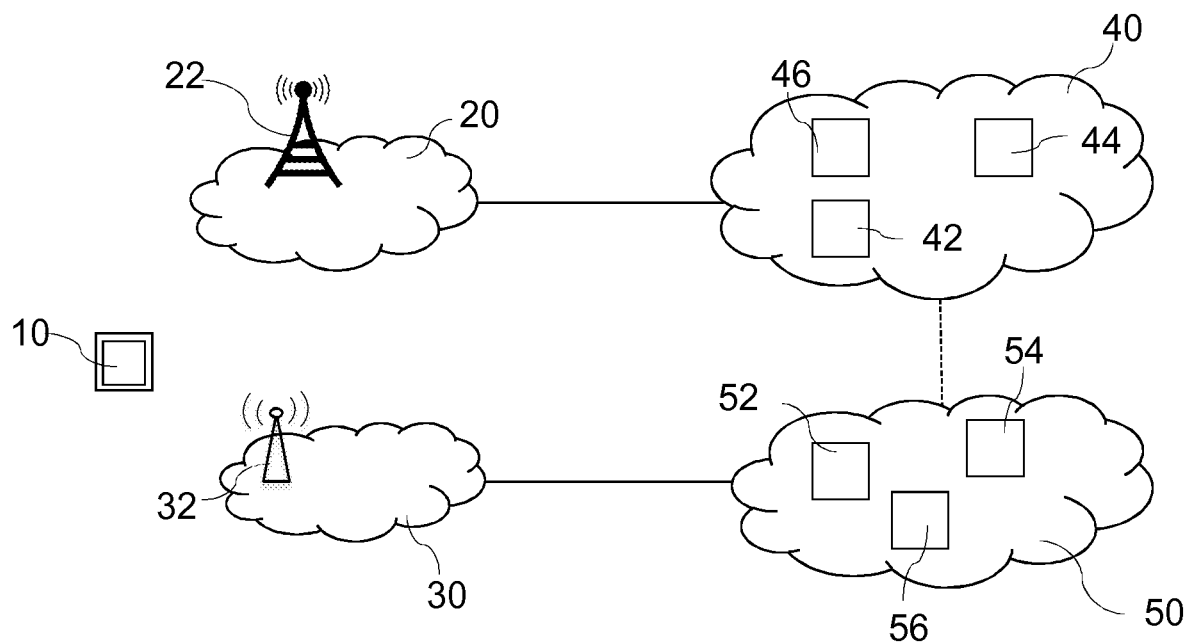
FIG. 1 illustrates an example communications system in accordance with at least some embodiments.

FIG. 1 illustrates a simplified example of a system. The system comprises a mobile device (MD) 10, such as a user equipment (UE). Without limiting to Third Generation Partnership Project (3GPP) User Equipment, the term user equipment/UE is to be understood broadly to cover various mobile/wireless terminal devices, mobile stations and devices for user communication and/or machine type or IoT communication. In some embodiments, the MD 10 is a constrained UE device, lacking some capabilities over a conventional or fully-equipped UE.

The MD10 may be configured to connect a non-public network (NPN) 30, 50. The NPN may comprise an (NPN) access network 30 with access network node(s), such as an access point (AP) of an IEEE802.11 based network or other non-3GPP access network, without however limiting to these examples. The NPN may comprise an NPN core network 50, which may comprise a set of appropriate core network functions 52, 54, 56. The NPN CN functions may be connected via the (NPN) access network 30 and/or the (PLMN) access network 20. The NPN may be a standalone NPN (SNPN), i.e. operated by an NPN operator and not relying on network functions provided by a PLMN, or a public network integrated NPN, i.e. a non-public network deployed with the support of a PLMN. Public network integrated NPNs can be enabled using network slicing.

The system also comprises a public mobile network 20, 40, comprising a cellular or public land mobile network (PLMN) access network 20 and a core network 40. The mobile device 10 may also be configured to access a network node 22, such as a NodeB, evolved NodeB (eNB), Next Generation (NG) NodeB (gNB), a base station, an access point, or other suitable wireless/radio access network device or system. The access network node 22 is connected to further network node(s), such as a Next Generation core network, Evolved Packet Core (EPC), or other network management element. However, in some embodiments, such as industrial IoT applications, it may be adequate to have the MD 10 to communicate only with the NPN 30. Further, it will be appreciated that in some applications, the MD may remain stationary, e.g. at an installation location at a factory, instead of moving between base stations.

The PLMN access network 20 and the NPN access network 30 may comprise further network nodes or functions and may be connected to a respective core network 40, 50. The core network 40, 50 may comprise various network functions 42, 44, 46, 52, 54, 56. A network function in the present application may refer to an operational and/or physical entity. The network function may be a specific network node or element, or a specific function or set of functions carried out by one or more entities, such as virtual network elements. Examples of such network functions include an access control or management function, mobility management or control function, session management or control function, interworking, data management or storage function, authentication function or a combination of one or more of these functions. For example, there may be an interworking network function 42 supporting interfacing the PLMN core network 40 to the NPN core network 30.

There may be an authenticator network function 46, 56 configured to authenticate the MD 10. There may be an authentication information provider network function 44, 54 configured to provide authentication information for mobile device authentication. The MD 10 and the NPN 50 need to be in possession of the security credentials corresponding to the authentication method used for primary authentication, based on the NPN operator policy.

The NPN may be a mobile communications network comprising or connected to mobile communications core network functions even though non-cellular or non-3GPP access network, such as IEEE802.11 based access network is applied. In some embodiments, the core network 40, 50 is based on 3GPP 5G core network functions. In the 5G core network, user plane (UP) functions are separated from control plane (CP) functions. Access and Mobility Management Function AMF and Session Management Function SMF provide CP functions. For example, the network function 52 may be an AMF function. The SMF controls one or more User Plane Functions UPF for handling user plane path of packet data unit (PDU) sessions for the UE. The AMF may comprise termination of the RAN CP N2 interface, registration management, connection management, reachability management, mobility management, access authentication, access authorization, Security Anchor Functionality (SEAF), Security Context Management (SCM), and support of N2 interface for non-3GPP access.

The 5G Core Network supports the connectivity of the UE via non-3GPP access and NPN network(s) 50, e.g. via WLAN access, which may or may not be trusted. Non-3GPP access networks may connect to the 5G Core Network via a Non-3GPP InterWorking Function (N3IWF).

Authentication Server Function AUSF communicates with the AMF over N12 reference point. In case of Universal Subscriber Identity Module (USIM) based authentication, the AMF requests and receives security material from the AUSF. The AUSF handles authentication request for 3GPP and non-3GPP access.

The Unified Data Management UDM is connected to the AUSF over N13 reference point and to the AMF over N8 reference point. The UDM may store subscriber and authentication data for the subscriber (represented by USIM) and may comprise support for generation of 3GPP authentication credentials, user identification handling, access authorization based on subscription data (e.g. roaming restrictions), serving network function registration, subscription management, without limiting to these functionalities. Authentication credential Repository and Processing Function (APRF) stores the same the same long-term key K, as stored in universal SIM (USIM) of a UE used for generating the authentication credentials for authenticating the UE towards PLMN core network 50.

With the introduction of 5G, more machine type communications or IoT devices connect to the mobile network. These devices may be constrained and may not support the same state of the art tamper resistant HW, such as subscriber identification module (SIM)/USIM at a universal integrated circuit card (UICC) or embedded SIM/USIM of a regular mobile device. Additionally, unlike classical service provider networks, not all networks will be public, but industrial IoT will connect to manufacturer owned private networks using non-3GPP credentials. There is thus a need for alternative ways to facilitate mobile devices authentication, particularly such constrained devices for mobile communications network access.

An improved procedure has now been developed, in which a key for authentication credentials generation is generated on the basis of measurement of mutable code of a mobile device. The key may serve as a long-term shared secret similarly as the K for 3GPP networks. However, it is to be appreciated that the key may be applied in another way as an input for generating authentication credentials in case other (non-3GPP) type of authentication procedure is applied in the network.

Figure 2:
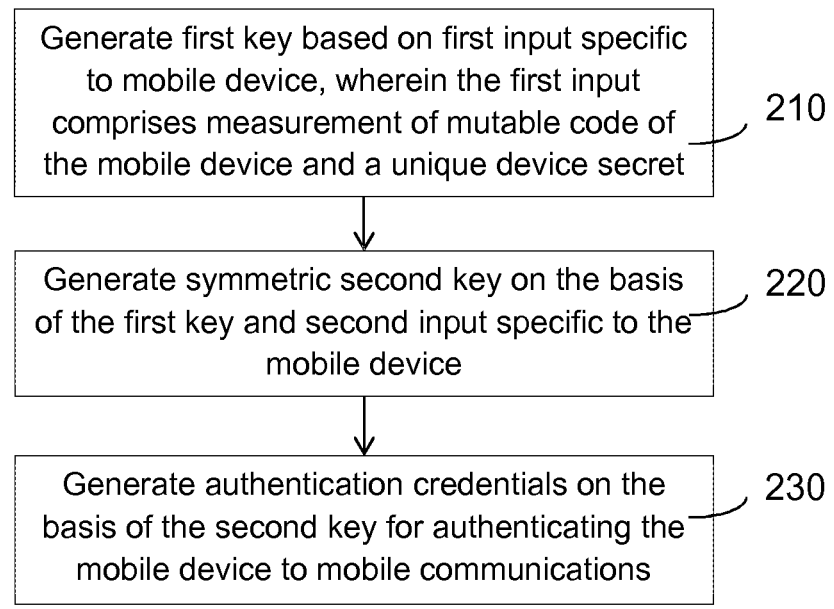
FIG. 2 illustrates a method in accordance with at least some embodiments.

FIG. 2 illustrates a method for generating authentication credentials for authenticating a mobile device to a mobile communications network according to some embodiments. The method may be applied by an apparatus generating credentials for authenticating a wireless device in an NPN, such by the mobile device 10, a network function or node of the NPN, or a controller or module thereof.

The method comprises generating 210 a first key based on a first input specific to a mobile device, wherein the first input comprises measurement of mutable code of the mobile device and a unique device secret of the mobile device, e.g. the MD 10. A symmetric second key is generated 220 on the basis of the first key and a second input specific to the mobile device. Authentication credentials are generated 230 on the basis of the second key for authenticating the mobile device to a mobile communications network.

Depending on the applied authentication method, block 230 may involve generation of further key(s) for generating an authentication token or (expected) response, for example. The mutable code may be code, such as mobile device software or firmware, stored and executed in the mobile device, and which may change during or as a result of processing. The mutable code may be replaceable. In some embodiments, the measurement is performed by generating a cryptographic hash of the mutable code, such as a firmware image.

It will be appreciated that that various there may be further stages/blocks in the method. For example, the second key is stored after generation 220 and accessed in response to initiation of authentication procedure or authentication request. Some further example embodiments are now illustrated, with further references to 3GPP 5G system, without however limiting the disclosed features to such system.

By applying the method, pre-provisioning of authentication credentials, such as shared secret for further key generation is not required, and authentication can be reliably arranged for a constrained mobile device lacking normal security hardware, such as UICC with SIM/USIM. The symmetric second key may be used for authentication between the constrained mobile device and the mobile network, such as the NPN core network 50, in some embodiments similarly as the key K in 3GPP UEs and PLMNs.

The manufacturer of the mobile device may provide appropriate key-generation input information of the device, or the already established first key or the second key of the device to a mobile device operator and further to relevant network function configured to generate a corresponding second key in the operator network, such as AUSF, UDM, or an AAA server of NPN network 50. Similar methods as for providing the key K may be applied, for example.

In some embodiments, block 210 is entered before execution of the mutable code, e.g. each time the mobile device is reset. Thus, the resulting second key may be updated each time the mutable code is updated, for example. In some embodiments, the first key is generated 210 and stored upon initial bootstrapping of the mobile device, before the mutable code is executed. The second key may be generated 220 based on the stored first key during use of the mobile device, in some embodiments when the mobile device needs to be authenticated. Thus the second key does not have to be permanently stored, and further security can be achieved if an input parameter thereof is changed over time.

Figure 3:
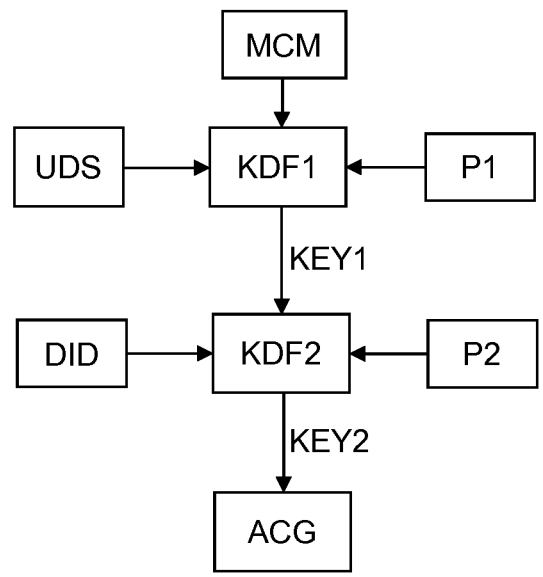
FIG. 3 illustrates key generation procedure in accordance with at least some embodiments.

FIG. 3 illustrates credentials generation according to some embodiments. A first key-derivation function KDF1 generates (210) the first key KEY1 on the basis of unique device secret UDS and the mutable code measurement MCM.

Further input parameter(s) P1 may be configured to be applied to generate the KEY1. These input parameter(s) may be further specific of one or more of hardware, software, and configuration data of the mobile device. In some embodiments, measurement of hardware state and/or configuration data of the mobile device is applied as the further input P1. For example, parameter(s) of secure debug configuration may be applied as input parameter(s).

KEY1 is input to a second KDF (KDF2), which generates the second key KEY2 based on the KEY1 and a device identifier (DID). Further input parameter(s) P2 may be applied to generate the KEY2. In an embodiment, a counter input is applied, which may be applied to generate a unique KEY2 for each authentication round. In an embodiment, further mobile device characteristics are applied, such as is the mobile device a production or development device and/or is debug enabled/disabled.

In some embodiments, a secure hash function or a keyed-hash message authentication code (HMAC) function (enabling higher protection level) is applied to the first input to generate 210 the first key KEY1 and/or to the second input to generate 220 the second key KEY2.

In some embodiments, the authentication credentials are generated as part of an authentication and key agreement (AKA) based authentication procedure, such as 5G AKA or EAP-AKA'. The purpose of AKA procedures is to enable mutual authentication between a UE, such as the MD 10 and the mobile network 40, 50, and provide keying material that can be used between the user equipment and network in subsequent security procedures. For 3GPP 5G PLMN networks, 5G AKA and EAP-AKA' are supported authentication methods. For NPNs the EAP authentication framework with support of any EAP method is envisioned, such as EAP-TLS or EAP-TTLS.

The MD 10 and the NPN 50 may be configured to perform 5G AKA (defined in Chapter 6.1.3.2 of 3GPP specification 33.501 "Security architecture and procedures for 5G system", current version 15.4.0 2019 March) or EAP-AKA' (defined in Chapter 6.1.3.1 of the 3GPP specification 33.501), EAP-TLS defined in Annex B of said 3GPP specification, or another EAP-based authentication method, on the basis of the second key generated as illustrated above, as the shared secret or key K in the MD 10 and the NPN core network 50. However, it is to be noted that in some embodiments the MD 10 does not comprise a USIM, but a cryptography module of the MD 10 may be configured to perform tasks defined for the USIM in the 3GPP specification, and in particular generate the authentication credentials on the basis of the second key.

The DID and possible other parameters P2 may be provided to the KDF2 as a string S constructed from n+1 input parameters:

$$S=FC\|P0\|L0\|P1\|L1\|P2\|L2\|\ldots\|Pn\|Ln$$

where FC is used to distinguish between different instances of the algorithm, P0 . . . Pn are the n+1 input parameter encodings and L0 . . . Ln may be two-octet representations of length of the corresponding input parameter encodings P0 . . . Pn. In some embodiments, the KDF2 is: derived key (KEY2)=HMAC-SHA-256 (KEY1, S).

In some embodiments, a cipher key, such as the CK or CK' of a 3GPP system, and an integrity key, such as IK or IK' is generated in block 230 on the basis of the symmetric second key.

In some embodiment, an extended master session key (EMSK) is generated on the basis of the symmetric second key, e.g. in support of an EAP-based authentication method according to the EAP framework (RFC 3748). The EMSK may be generated by the EAP authentication procedure based on the second key as for EAP-AKA'. On the basis of the EMSK, key $K_{AUSF}$ may be derived, being used for authentication vector. Anchor key $K_{SEAF}$ may be calculated from the $K_{AUSF}$ (by AUSF of home network for SEAF of serving network).

In an example embodiment, the MD 10 is configured to apply the concatenation CK∥IK of CK and IK during the AKA procedure as a key for deriving response RES* value (sent to the network) from first calculated RES, random number RAND, and serving network name. An NPN authentication information generating network function, such as the ARPF, is configured to apply the concatenation CK∥IK of CK and IK for deriving expected response XRES* from XRES, RAND, and the serving network name in the ARPF. As indicated, the CK and IK may be generated based on the second key generated as illustrated above in connection with the method of FIG. 2. In case EAP-AKA' is used, the ARPF may derive CK' and IK' from the second key and derive the EMSK based on the CK' and IK'. The APRF may derive $K_{AUSF}$ from the second key in case 5G AKA is used. The ARPF forwards the derived keys to the AUSF for authenticating the MD 10.

However, it is to be appreciated that the above were just some examples of authentication procedures for which the second key may be applied. The second key may be applied for various other authentication procedures, some further examples comprising the AKA procedures defined in 3GPP specifications 33.102 and 33.401, and in relation to the EAP framework RFC 3748, such as EAP-TLS and EAP-TTLS.

Figure 4:
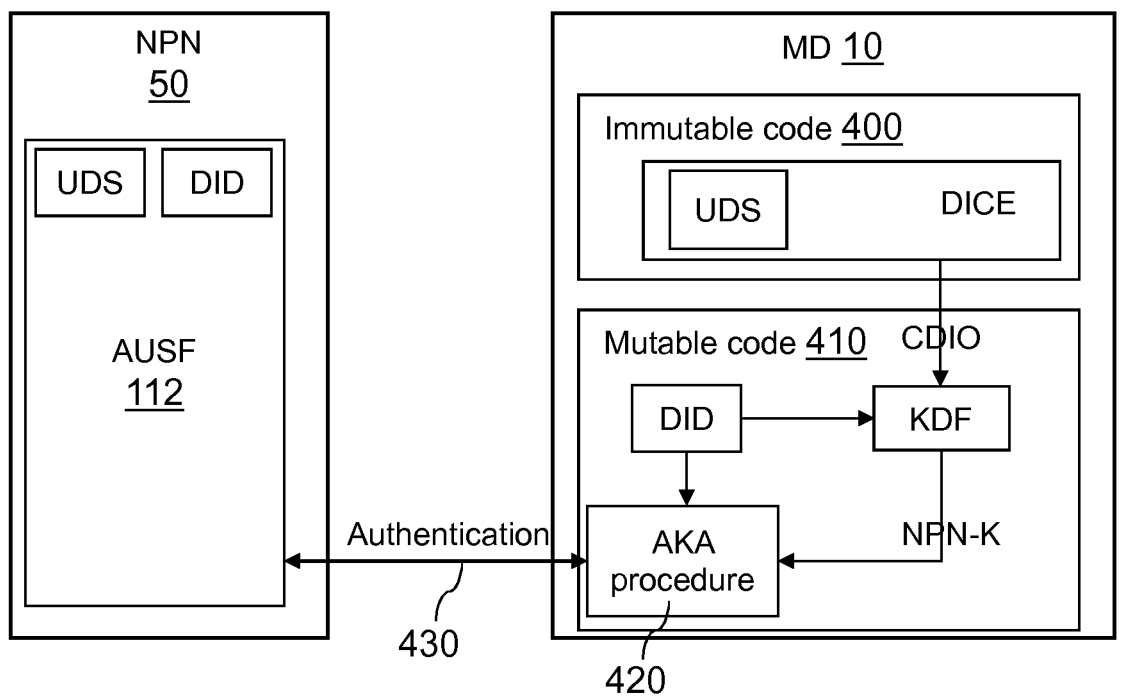
FIG. 4 illustrates an example embodiment utilizing DICE.

In some embodiments, the first key is or is based on a dynamically created device identifier, in some embodiments a compound device identifier (CDI) generated by applying at least some features of the device identifier composition engine (DICE) protocol. CDI is a value used to identify the first mutable code and the system executing the first mutable code. FIG. 4 illustrates an example configuration in which DICE is running in immutable code 400 of the MD 10.

The DICE (device identifier composition engine) may be configured to derive the first key, herein referred to as CDI0, which may depend on the following device properties: the measure of the mutable code, the device state (e.g. secure debug configuration), and the unique device secret UDS. The immutable code may hash the firmware image(s) and state information and derive the CDI0 based on this operation The DICE will restrict access to the UDS enforced by HW. Due to the DICE protocol CDI0 is only valid if the mutable code is not changed.

The symmetric second key, in the present NPN example referred to as NPN-K, is derived from CDI0 and the device ID DID (which is independent of the dynamically created CDI CDI0), both input to a KDF. The KDF creates a binding to both the device state and the DID, making the key K unique to one specific device. It is to be noted that additional parameter(s) may be applied, e.g. as illustrated above in connection with FIG. 4. Hence the NPN-K is created based on the immutable code input and the mutable code input in both the NPN 50 and the mobile device MD 10.

The NPN-K may then be applied for AKA based authentication procedure 420 between the mobile terminal and the mobile communications network, and in the present example with the AUSF 112 in the NPN 50 and within the MD 10.

As further illustrated in FIG. 4, in some embodiments the device identifier DID is further applied as an input for the AKA based authentication procedure 420. The AUSF 112 may then obtain the correct information and calculate (or retrieve) the corresponding shared secret (symmetric second key) NPN-K to generated authentication credentials for authenticating 430 the MD 10, which may calculate (or retrieve) the secret NPN-K in a similar way.

The NPN operator may initially receive the NPN-K or the required KDF input data, from the mobile device vendor, similar as in traditional PLMNs, where the UICC vendor would provide the K to be stored in the UICC and in the operator domain. This is possible, since the state is already known beforehand and the measure of the image could be done as part of the build or stitching process of the image. The device state may be reflected in certificates or hard-coded values in the image. Configurations could be trace enable/disable, jtag enable/disable. MMU lock/unlock etc.

If the KDF input data is provided, since the operator may have provided the mutable code to the device in the first place, a dedicated network function NF in the NPN operator's network can calculate CDI equally as the MD 10 based on the information stored in the subscriber database and generate NPN-K equally. The dedicated network function could be the NPN-UDM, the AUSF or an AAA server.

It is to be noted that at least some of the network functions or nodes illustrated above, such as the authenticator network function (46 or AMF) and/or the authentication information provider network function (44, AUSF, UDM) may be shared between two physically separate devices forming one operational entity. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer. External network virtualization is targeted to optimized network sharing. Another category is internal virtual networking which provides network-like functionality to the software containers on a single system. For example, instances of the AMF, SMF, AUSF, and UDM can be instantiated as virtual functions in network function virtualization architecture (NFV).

An electronic device comprising electronic circuitries may be an apparatus for realizing at least some embodiments of the present invention. The apparatus may be or may be comprised in a computer, a laptop, a tablet computer, a cellular phone, a machine to machine (M2M) or an IoT device, a PLMN or NPN node or any other apparatus provided with mobile communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 5:
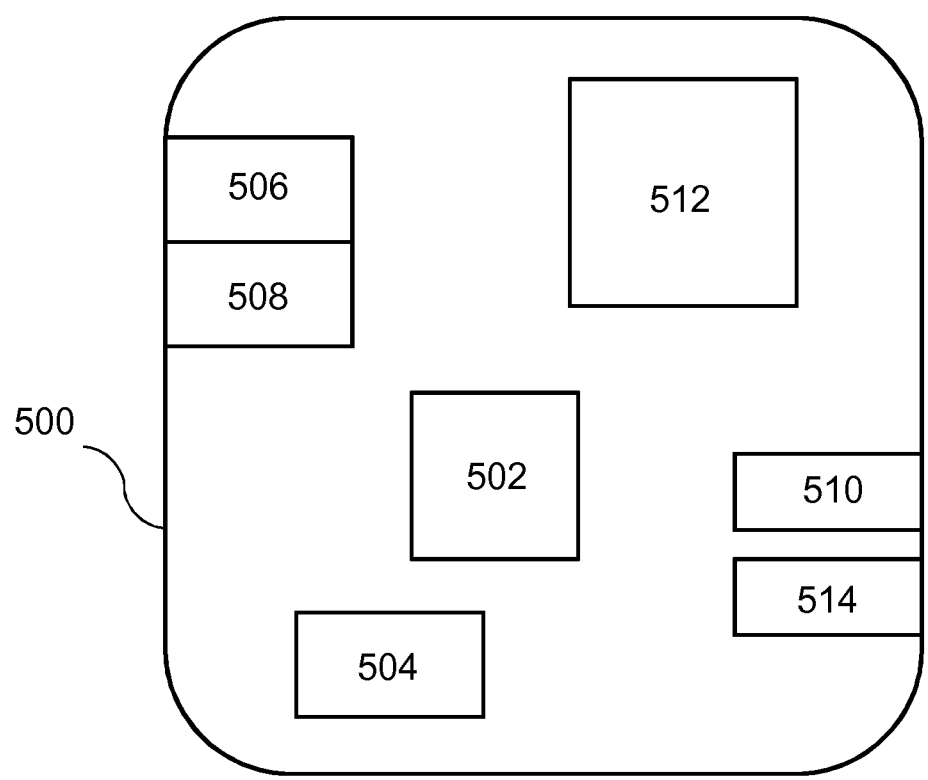
FIG. 5 illustrates an example apparatus capable of supporting at least some embodiments.

FIG. 5 illustrates an example apparatus capable of supporting at least some embodiments. Illustrated is a device 500, which may comprise a communications device configured to operate as the mobile device 10, for example. The device may include one or more controllers configured to perform operations in accordance with at least some of the embodiments illustrated above, such as some or more of the features illustrated above in connection with FIGS. 2 to 4. The device may be configured to operate as the apparatus configured to carry out the method of FIG. 2.

Comprised in the device 500 is a processor 502, which may comprise, for example, a single- or multi-core processor wherein a single-core processor comprises one processing core and a multi-core processor comprises more than one processing core. The processor 502 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 500 may comprise memory 504. The memory may comprise random-access memory and/or permanent memory. The memory may comprise at least one RAM chip. The memory may comprise solid-state, magnetic, optical and/or holographic memory, for example. The memory may be at least in part comprised in the processor 502. The memory 504 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 500 but accessible to the device. For example, input parameters and control parameters affecting operations related to above-illustrated key generation may be stored in one or more portions of the memory and used to control operation of the apparatus.

The device 500 may comprise a transmitter 506. The device may comprise a receiver 508. The transmitter and the receiver may be configured to transmit and receive, respectively, information in accordance with at least one cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 3GPP new radio access technology (N-RAT), IS-95, wireless local area network, WLAN, and/or Ethernet standards, for example. The device 500 may comprise a near-field communication, NFC, transceiver 510. The NFC transceiver may support at least one NFC technology, such as NFC, Bluetooth, Wibree or similar technologies.

The device 500 may comprise user interface, UI, 512. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 504 or on a cloud accessible via the transmitter 506 and the receiver 508, or via the NFC transceiver 510, and/or to play games.

The device 500 may comprise or be arranged to accept a module 514. The module may comprise, for example, a subscriber identity module, SIM, card or another type of memory or cryptographic module installable in the device 500. The module 514 may comprise information identifying a subscription of a user of device 500. The user identity module 514 may comprise cryptographic information usable to verify the identity of a user of device 500 and/or to facilitate authentication and/or encryption of communicated information.

The processor 502 may be furnished with a transmitter arranged to output information from the processor, via electrical leads internal to the device 500, to other devices comprised in the device. Such a transmitter may comprise a serial bus transmitter arranged to, for example, output information via at least one electrical lead to memory 504 for storage therein. Alternatively to a serial bus, the transmitter may comprise a parallel bus transmitter. Likewise the processor may comprise a receiver arranged to receive information in the processor, via electrical leads internal to the device 500, from other devices comprised in the device 500. Such a receiver may comprise a serial bus receiver arranged to, for example, receive information via at least one electrical lead from the receiver 508 for processing in the processor. Alternatively to a serial bus, the receiver may comprise a parallel bus receiver.

The device 500 may comprise further devices not illustrated in FIG. 5. For example, the device may comprise at least one digital camera. The device may comprise one or more sensors, such as an environment sensor or a fingerprint sensor arranged to authenticate, at least in part, a user of the device. In some embodiments, the device lacks at least one device described above. For example, some devices may lack the NFC transceiver 510, a display/UI 512, and/or the user identity module 514.

The processor 502, the memory 504, the transmitter 506, the receiver 508, the NFC transceiver 510, the UI 512 and/or the user identity module 514 may be interconnected by electrical leads internal to the device 500 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising at least one processor; and at least one memory including computer program code, the at least one memory and computer program code being configured to, with the at least one processor, to cause the apparatus to at least perform:
generate a first key based on a first input specific to a mobile device, wherein the first input comprises measurement of mutable code of the mobile device and a unique device secret;
generating a cryptographic hash of the mutable code, wherein the mutable code includes a firmware image;
generate a symmetric second key on the basis of the first key and a second input specific to the mobile device, wherein the second input comprises a device identifier of the mobile device;
generate authentication credentials on the basis of the second key for authenticating the mobile device to a mobile communications network, wherein the authentication credentials are generated as part of an authentication and key agreement based authentication procedure;
generate a cipher key and an integrity key on the basis of the second key; and
use the device identifier as an input for authentication and key agreement based authentication procedure between the mobile device and the mobile communications network.

2. The apparatus of claim 1, wherein the at least one memory and computer program code are further configured to, with the at least one processor, to cause the apparatus to perform: generate an extended master session key on the basis of the second key.

3. The apparatus of claim 1, wherein the first input further comprises measurement of hardware state and configuration.

4. The apparatus of claim 1 wherein the at least one memory and computer program code are further configured to, with the at least one processor, to cause the apparatus to perform: apply a secure hash function or a keyed-hash message authentication code function to the first input to generate the first key.

5. The apparatus of claim 1, wherein the mobile device is a constrained user equipment device, such as an internet-of-things device, and the mobile communications network is a non-public network.

6. The apparatus of claim 1, wherein the at least one memory and computer program code are further configured to, with the at least one processor, to cause the apparatus to perform: generate the first key by immutable code of the mobile device and the second key by a key derivation function in mutable code of the mobile device.

7. The apparatus of claim 1, wherein the at least one memory and computer program code are further configured to, with the at least one processor, to cause the apparatus to perform: generate an authentication response on the basis of the second key and an authentication vector received in an authentication request from the mobile communications network, for authenticating the mobile device to the mobile communications network.

8. The apparatus of claim 1, wherein the apparatus is or comprises the mobile device operating as a user equipment to the mobile communications network.

9. The apparatus of claim 1, wherein the apparatus comprises a unified data management function, an authentication server function, or an authentication, authorization, and accounting server of the mobile communications network.

10. A method, comprising:
generating a first key based on a first input specific to a mobile device, wherein the first input comprises measurement of mutable code of the mobile device and a unique device secret;
generating a cryptographic hash of the mutable code, wherein the mutable code includes a firmware image;
generating a symmetric second key on the basis of the first key and a second input specific to the mobile device, wherein the second input comprises a device identifier of the mobile device;
generating authentication credentials on the basis of the second key for authenticating the mobile device to a mobile communications network, wherein the authentication credentials are generated as part of an authentication and key agreement based authentication procedure;
generate a cipher key and an integrity key on the basis of the second key; and
use the device identifier as an input for authentication and key agreement based authentication procedure between the mobile device and the mobile communications network.

11. The method of claim 10, wherein the authentication credentials are generated as part of an authentication and key agreement based authentication procedure.

12. The method of claim 10, wherein a cipher key and an integrity key is generated on the basis of the second key.

13. The method of claim 10, wherein an extended master session key is generated on the basis of the second key.

14. The method of claim 10, wherein the first input further comprises measurement of hardware state and configuration.

15. The method of claim 10, wherein a secure hash function or a keyed-hash message authentication code function is applied to the first input to generate the first key.

16. A non-transitory computer readable medium having stored thereon a set of computer readable instructions that, when executed by at least one processor, cause an apparatus to at least:
generating a first key based on a first input specific to a mobile device, wherein the first input comprises measurement of mutable code of the mobile device and a unique device secret;
generating a cryptographic hash of the mutable code, wherein the mutable code includes a firmware image;
generating a symmetric second key on the basis of the first key and a second input specific to the mobile device, wherein the second input comprises a device identifier of the mobile device;
generating authentication credentials on the basis of the second key for authenticating the mobile device to a mobile communications network, wherein the authentication credentials are generated as part of an authentication and key agreement based authentication procedure;
generate a cipher key and an integrity key on the basis of the second key; and
use the device identifier as an input for authentication and key agreement based authentication procedure between the mobile device and the mobile communications network.

* * * * *